(12) United States Patent
Yeo et al.

(10) Patent No.: US 9,391,535 B2
(45) Date of Patent: Jul. 12, 2016

(54) RECEIVED POWER CONVERSION DEVICE FOR RESONANT WIRELESS CHARGING SYSTEM

(71) Applicants: Samsung Electronics Co., Ltd., Gyeonggi-do (KR); Korea Advanced Institute of Science and Technology (KAIST), Daejeon (KR)

(72) Inventors: Sung-Ku Yeo, Gyeonggi-do (KR); Gyu-Hyeong Cho, Daejeon (KR); Se-Ho Park, Gyeonggi-do (KR); Se-Ki Kim, Jeollabuk-do (KR); Young-Min Lee, Gyeonggi-do (KR); Jun-Han Choi, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 840 days.

(21) Appl. No.: 13/659,358

(22) Filed: Oct. 24, 2012

(65) Prior Publication Data

US 2013/0099591 A1    Apr. 25, 2013

(30) Foreign Application Priority Data

Oct. 24, 2011   (KR) .................. 10-2011-0108808

(51) Int. Cl.
    *H01F 38/14*    (2006.01)
    *H02M 7/217*   (2006.01)
    *H02M 3/337*   (2006.01)
    *H02J 7/02*    (2016.01)

(52) U.S. Cl.
    CPC .............. *H02M 7/217* (2013.01); *H02J 7/025* (2013.01); *H02M 3/3376* (2013.01); *Y02B 70/1433* (2013.01); *Y02B 70/1441* (2013.01)

(58) Field of Classification Search
    CPC ..... H02M 3/376; H02M 7/217; H02M 3/336; H02J 7/025; Y02B 70/1433; Y22B 70/1441
    USPC .......................................... 307/104
    See application file for complete search history.

(56) References Cited

U.S. PATENT DOCUMENTS

| | | | | |
|---|---|---|---|---|
| 4,257,087 | A | * | 3/1981 | Cuk ................................ 363/16 |
| 4,975,819 | A | * | 12/1990 | Lannuzel ....................... 363/16 |
| 6,301,128 | B1 | * | 10/2001 | Jang et al. ...................... 363/17 |
| 2005/0073860 | A1 | * | 4/2005 | Yang et al. ..................... 363/16 |
| 2005/0162872 | A1 | * | 7/2005 | Hirabayashi et al. ........... 363/19 |
| 2009/0097280 | A1 | * | 4/2009 | Wu et al. ........................ 363/17 |
| 2010/0181963 | A1 | * | 7/2010 | Schreiber ................ H02J 7/022 320/108 |
| 2013/0026836 | A1 | * | 1/2013 | Dighrasker et al. ............ 307/66 |

* cited by examiner

*Primary Examiner* — Rexford Barnie
*Assistant Examiner* — Terrence Willoughby
(74) *Attorney, Agent, or Firm* — The Farrell Law Firm, P.C.

(57) ABSTRACT

Provided is a received power conversion device for a resonant wireless charging system, including a wireless power receiver for receiving wireless power from a wireless power transmission device, a rectifier for rectifying power in an Alternating Current (AC) form received in the wireless power receiver into a Direct Current (DC), a free-wheeling switching unit for switching according to a switching control signal to form a path for free-wheeling the power in the AC form, a feedback circuit fed back with an output signal of a corresponding power conversion device to detect a level of the output signal, and a controller for controlling switching of the free-wheeling switching unit according to the output level detected by the feedback circuit.

11 Claims, 4 Drawing Sheets

RECEIVED POWER CONVERSION DEVICE FOR RESONANT WIRELESS CHARGING SYSTEM

PRIORITY

This application claims priority under 35 U.S.C. §119(a) to a Korean Patent Application filed in the Korean Intellectual Property Office on Oct. 24, 2011 and assigned Serial No. 10-2011-0108808, the contents of which are incorporated herein by reference.

BACKGROUND OF THE INVENTION

1. Field of the Invention

The present invention relates generally to a wireless charging technology, and more particularly, to a received power conversion device for a resonant wireless charging system.

2. Description of the Related Art

Recent times have seen a growth in the development and implementation of wireless charging and non-contact charging technologies.

With the wireless charging technology, for example, wireless power transmission/reception can allow a battery to be automatically charged merely by being placed on a charging pad without connecting a separate charging connector to a cellular phone. Wireless electric toothbrushes and wireless electric shavers are well-known applications of the wireless charging technology. A waterproof function of the wireless charging technology improves portability and wireless charging of an electronic product, as the need for a wired charger is obviated. Moreover, wireless charging technology will likely be substantially applied to electric vehicles.

The wireless charging technology may be roughly divided into an electromagnetic induction type using a coil, a resonant using resonance, and a Radio Frequency (RF)/micro wave radiation type for transforming electrical energy into a microwave for delivery.

Power transmission using electromagnetic induction transmits power between a primary coil and a secondary coil. When a magnet is moved in a coil, induced current is generated, and is used by a transmission terminal to generate an electromagnetic field. In a reception end, current is induced according to a change in the electromagnetic field, thus producing energy. Such a phenomenon is referred to as a magnetic induction phenomenon and a power transmission method using this phenomenon has superior energy transmission efficiency.

As to the resonant, Soljacic, a professor at the Massachusetts Institute of Technology (MIT), disclosed as the coupled mode theory, a system in which by using a resonant power transmission principle, electricity is wirelessly delivered in spite of a distance of several meters from a charging device. The wireless charging system of the MIT team resonates an electromagnetic wave containing electrical energy. The resonated electrical energy is directly delivered only when there is a device having a resonance frequency, and the non-used portion of the resonated electrical energy is absorbed again into an electromagnetic field, instead of being spread through the air, such that unlike other electromagnetic waves, the resonated electrical energy does not appear to have an influence upon a peripheral machine or the human body.

A wireless power receiver of a conventional resonant has to consider the use of a rectifying circuit for converting a received Alternating Current (AC) waveform into a Direct Current (DC) waveform, a DC-DC converting circuit for adjusting rectified DC-waveform power to a preset voltage value of an output end, and a plurality of large-capacity passive elements. Thus, significant restrictions may exist in their mounting sizes.

Such restrictions give rise to difficulties in applying a wireless charging system to such size-sensitive devices as a portable terminal.

Consequently, there is a need in the art to reduce the sizes of wireless charging related devices while providing them with high power and efficiency.

SUMMARY OF THE INVENTION

Accordingly, the present invention provides a received power conversion device for a resonant wireless charging system, which has a small size while having high power and efficiency, to be suitable for application to equipment such as a portable terminal.

According to an aspect of the present invention, there is provided a received power conversion device for a resonant wireless charging system, including a wireless power receiver for receiving wireless power transmitted from a wireless power transmission device, a rectifier for rectifying power in an AC form received in the wireless power receiver into DC, a free-wheeling switching unit for performing a switching operation according to a switching control signal to form a path for free-wheeling the power in the AC form received in the wireless power receiver, a feedback circuit fed back with an output signal of a corresponding power conversion device to detect a level of the output signal, and a controller for controlling a switching operation of the free-wheeling switching unit according to the output level detected by the feedback circuit.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF EMBODIMENTS OF THE PRESENT INVENTION

Figure 1:
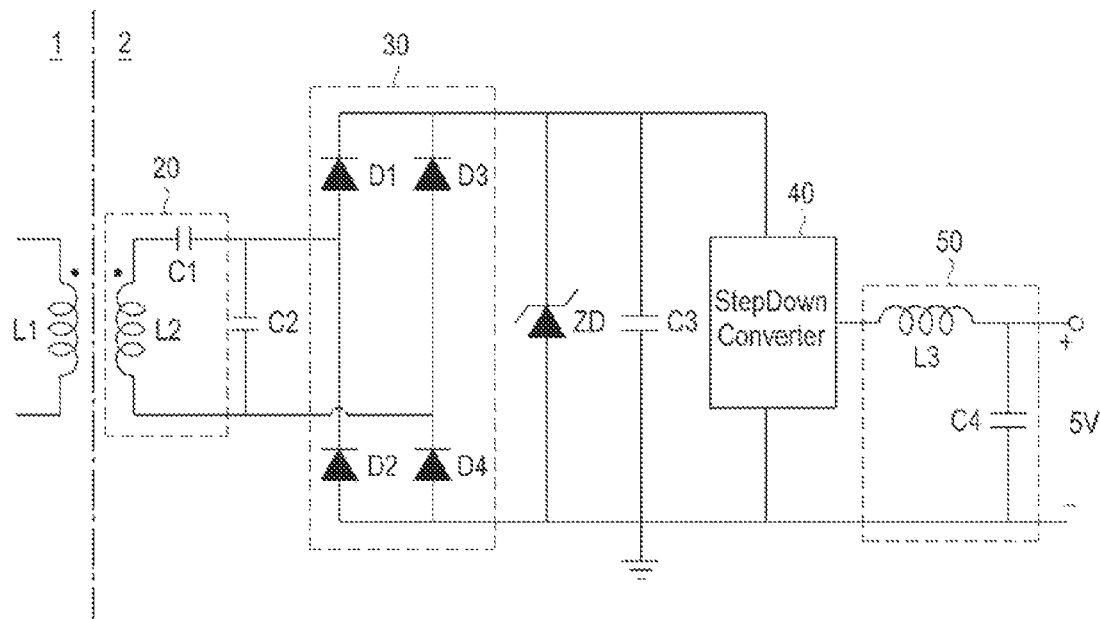
FIG. 1 is a circuit diagram of a received power conversion device for a resonant wireless charging system to which the present invention is applied.

Hereinafter, embodiments of the present invention will be described in detail with reference to the accompanying drawings. In the following description, like components are given like reference numerals (symbols). A detailed description of known functions and configurations incorporated herein will be omitted for the sake of clarity and conciseness.

FIG. 1 is a circuit diagram of a received power conversion device for a resonant wireless charging system to which the present invention is applied.

Referring to FIG. 1, a wireless charging system may be divided into a wireless power transmission device 1 for transmitting wireless power and a wireless power reception device 2 for receiving wireless power. The wireless power reception device 2, as a received power conversion device, includes a wireless power receiver 20 for receiving wireless power transmitted from the wireless power transmission device 1, a rectifier 30 for rectifying power in an AC form received in the wireless power receiver 20 into a DC form, a DC-DC converter 40 for converting the DC power rectified by the rectifier 30 into operating power desired by a corresponding portable terminal, and a waveform stabilizer 50 for stabilizing and outputting a DC waveform of an output end.

Specifically, the wireless power receiver 20 may include a second coil L2 for absorbing electromagnetic waves emitted from a first coil L1 of the wireless power transmission device 1 and a resonating first capacitor C1 serially connected with the second coil L2.

The rectifier 30 may have a full-bridge diode structure using four diodes D1, D2, D3, and D4. For example, a serial connection circuit of the first diode D1 and the second diode D2 and a serial connection circuit of the third diode D3 and the fourth diode D4 are in parallel, and out of the parallel-connected two nodes, a connection node of the first diode D1 and the third diode D3 is set to be an output node and a connection node of the second diode D2 and the fourth diode D4 may be connected with a ground end.

In the wireless power receiver 20, the terminals of a serial connection circuit of the second coil L2 and a first capacitor C1 are connected with a connection point of the first diode D1 and the second diode D2 and a connection point of the third diode D3 and the fourth diode D4, respectively. A second capacitor C2 for power charging may be further connected in parallel with the wireless power receiver 20.

The DC-DC converter 40 is provided with an output of the rectifier 30 and converts the rectified DC into a DC of a desired level, and a type of step-down converter called a DC-DC buck converter is used to generate a DC signal of a desired level.

A Zener Diode (ZD) for circuit protection may be further connected in parallel between the rectifier 30 and the DC-DC converter 40, and a third capacitor C3 for power charging and stabilization may also be further connected in parallel therebetween.

The waveform stabilizer 50 may be implemented with an LC circuit which may include an inductor L3 serially connected with an output of the DC-DC converter 40 and a fourth capacitor C4 connected between an output of the inductor L3 and a ground end.

The power conversion circuit structure of the wireless power reception device 2 of a resonant magnetic induction power transmission scheme as shown in FIG. 1 receives wireless power from the wireless power receiver 20, generates induced current of a sine waveform, rectifies the induced current to some extent by using the rectifier 30 composed of a passive diode, and then obtains a desired output DC voltage by using a step-down converter including the buck converter.

Many passive elements, such as a high-capacity capacitor (third capacitor), for delivering power to a step-down converter, including the passive diode of the rectifier 30, are required in the foregoing power conversion device, causing much thickness of a corresponding device. To secure power conversion in the step-down converter, the waveform stabilizer 50 in the output terminal has to use a uH-level inductor L3 and an uH-level capacitor C4, and the thicknesses of these passive elements are generally 2t (mm) or more, thus being difficult to embed in a circuit of a portable device. As a result, the power conversion circuit structured as described above is difficult to apply to a high-efficiency and high-power portable device.

In a wireless power transmission system, cost, power transmission efficiency, and power consumption level are usually the most important factors. By using the resonant scheme, the efficiency of the power conversion circuit of the reception side is vital to maximize power transmission efficiency and stably deliver power received from the reception side. Moreover, capacity and size of an external passive element used in a conventional structure are significant obstacles when applying the power conversion circuit to a portable device.

Therefore, the present invention discloses a power conversion circuit without including a step-down converter in a rectifying circuit, and realizes a small size by reducing the number of passive elements and realizes highly efficient power conversion.

Figure 2:
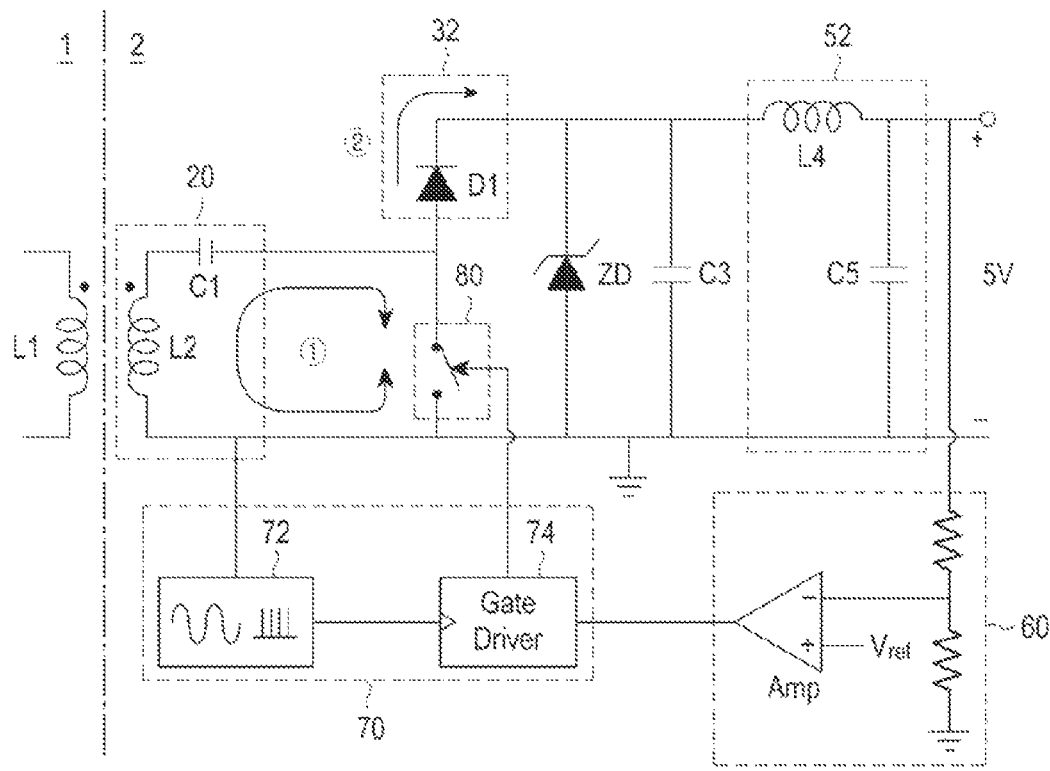
FIG. 2 is a circuit diagram of a received power conversion device for a resonant wireless charging system according to a first embodiment of the present invention.

FIG. 2 is a circuit diagram of a received power conversion device for a resonant wireless charging system according to a first embodiment of the present invention. Referring to FIG. 2, similar to the structure shown in FIG. 1, a received power conversion device includes a wireless power receiver 20 for receiving wireless power transmitted from the wireless power transmission device 1, a rectifier 32 for rectifying power in an AC form received in the wireless power receiver 20 into a DC, and a waveform stabilizer 52 for stabilizing and outputting a DC waveform of an output terminal. A ZD for circuit protection and the third capacitor C3 for power charging and stabilization may be further connected in parallel between the rectifier 32 and the waveform stabilizer 52.

According to characteristics of the present invention, a free-wheeling switching unit 80 is included to form a path for free-wheeling the AC-form power received in the wireless power receiver 20 through a switching operation by a switching control signal of an external source (controller). The AC-form power received in the wireless power receiver 20 is free-wheeled or provided to the rectifier 32 by the free-wheeling switching unit 80. The rectifier 32 may be implemented using only a first diode D1 according to the first embodiment of the present invention.

A feedback circuit 60 is also included to be fed back with an output signal of a corresponding power conversion device and detect a level of the output signal. A controller 70 is also provided to control the switching operation of the free-wheeling switching unit 80 according to the output level detected by the feedback circuit 60. The controller 70 controls the free-wheeling switching unit 80 to be turned on when the level of the output signal is higher than a reference level, such that the AC-form power received in the wireless power receiver 20 is free-wheeled. When the level of the output signal is lower than the reference value, the controller 70 controls the free-wheeling switching unit 80 to be turned off, such that the AC-form power received in the wireless power receiver 20 is provided to the rectifier 32.

Similar to the structure shown in FIG. 2, the wireless power receiver 20 may include the second coil L2 for absorbing electromagnetic waves emitted from the first coil L1 of the wireless power transmission device 1 and the resonant first capacitor C1 serially connected with the second coil L2.

The rectifier 32 may be implemented with one diode D1, and in the wireless power receiver 20, the first and second terminals of a serial connection circuit of the second coil L2 and the first capacitor C1 are connected with the first diode D1 and the ground end of the rectifier 32, respectively.

The feedback circuit 60 may be implemented with a comparator (OP-AMP), which is fed back with an output signal of a corresponding power conversion device, such as of the waveform stabilizer 52, and the feedback circuit 60 compares the output signal with a preset reference voltage Vref and outputs a comparison result.

The controller 70 may be configured to on/off control the operation of the free-wheeling switching unit 80 according to an output signal of the feedback circuit 60, but for the precise on/off control operation, the controller 70 is configured to generate an on/off signal in synchronization with the signal received in the wireless power receiver 20. To this end, the controller 70 includes a sync signal generator 72 for receiving a signal from the wireless power receiver 20 and generating a corresponding sync signal, and a driving unit 74 for generating, in synchronization with the sync signal generated by the sync signal generator 72, a driving signal for on/off control of the free-wheeling switching unit 80 according to an output of the feedback circuit 60.

Figure 3A:
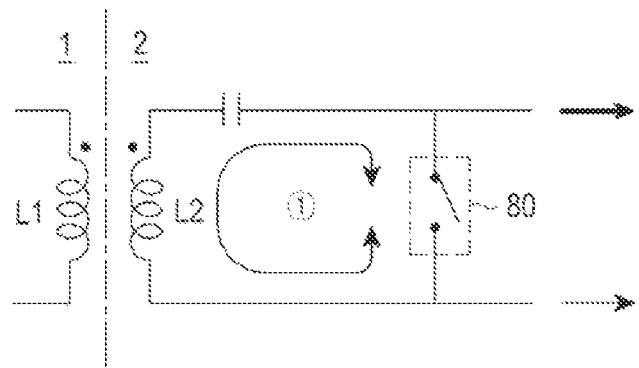
FIG. 3A is a partial circuit diagram of main portions of FIG. 2.
Figure 3B:
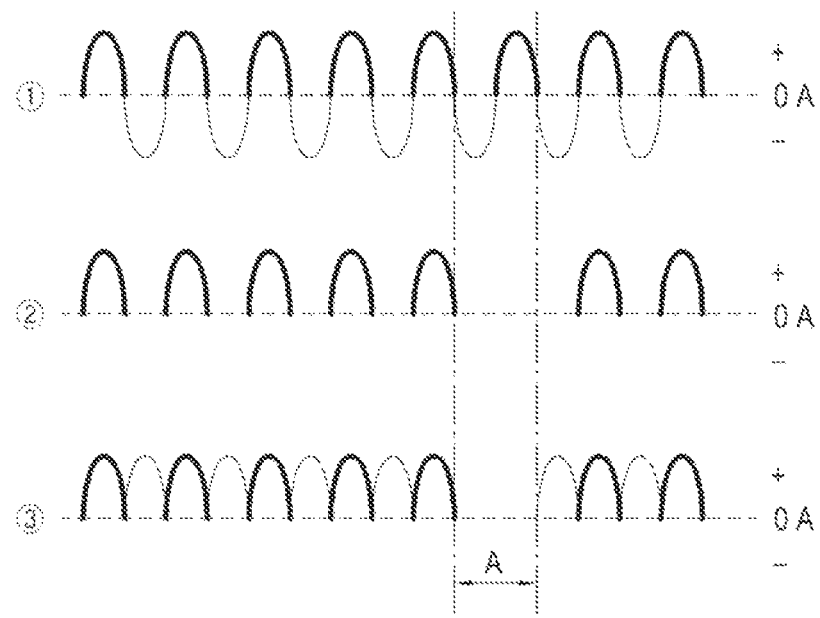
FIG. 3B is a signal waveform related to some portions of FIGS. 2 and 3A.

FIG. 3A is a partial circuit diagram of main portions of FIG. 2, i.e., of the free-wheeling switching unit 80 forming a free-wheeling path of the wireless power receiver 20, and FIG. 3B is a signal waveform related to some portions of FIGS. 2 and 3A. In FIGS. 3A and 3B, waveforms of signals indicated by thick solid lines are waveforms of signals output to a terminal of the wireless power receiver 20, e.g., a terminal which can be connected with the rectifier 32, and waveforms of signals indicated by thin solid lines are waveforms of signals output to the other terminal of the wireless power receiver 20, e.g., a terminal which can be connected with the ground end.

In FIG. 3B, a waveform of a signal '1' indicates a waveform of a signal generated by the wireless power receiver 20, a waveform of a signal '2' indicates a waveform of the signal output from the rectifier 32 in FIG. 2, and a waveform of a signal '3' indicates a waveform of an output signal when the signal received in the wireless power receiver 20 is fully rectified.

As can be seen in the waveform of the signal '2' in FIG. 3B, in the structure shown in FIG. 2, the signal provided to the rectifier 32 has a half-wave rectified form.

In addition, as can be seen in the waveforms of the signals '2' and '3', in a section A where no output signal exists (0 A), the free-wheeling switching unit 80 is currently in an on state, such that the received signal of the wireless power receiver 20 is in a free-wheeled state.

As such, the structure according to the present invention lowers power received in the wireless power receiver 20 to a proper level in advance and provides the lowered power to a rear end (without requiring a device such as a conventional DC-DC converter).

Referring to FIG. 2, the active free-wheeling switching unit 80 in a closed loop finely divides an AC signal input through a resonator structure of the wireless power receiver 20 in a time domain, free-wheels the AC signal, and then delivers the power to a load in the rear end when the switch is turned off. Based on a change in the load, the degree to which the load lightens is fed back and detected to on/off control the switch, thus adjusting the degree of delivery of the power to the load.

Such a series of processes are performed in the closed loop as shown in FIG. 3A, and when the free-wheeling switching unit 80 is implemented with an active Field Effect Transistor (FET) switch, it is finely controlled in a Pulse Width Modulation (PWM) scheme to obtain a desired DC level output. A switching ripple can be removed through a C-L-C filter structure in the rear end, that is, the third capacitor C3, the fourth inductor L4 and the fifth capacitor C5 of the waveform stabilizer 52. Moreover, capacitances of the fourth inductor L4 and the fifth capacitor C5 of the waveform stabilizer 52 as well as capacitances of the ZD and the third capacitor C3 may be decreased or the components outright omitted. For example, the waveform stabilizer 52 may use an uH-level inductor L4 and an uH-level capacitor C5.

In the power conversion structure as shown in FIG. 1, an intermediate voltage by the rectifier excessively increases, which is a natural phenomenon occurring when design has a margin in a resonance frequency to compensate for a large deviation in resonance output voltages according to loads in the resonant power conversion structure. However, in the structure of the present invention as shown in FIG. 2, an output voltage of the rectifier is adjusted with a particular voltage, eliminating the need for an additional step-down converter (DC-DC buck converter). With such a structural advantage, the structure of the present invention substantially reduces the use of passive elements, thus reducing size, and in addition, power conversion is implemented with a power conversion circuit of a single structure rather than a two-step structure, thereby further improving power conversion efficiency.

That is, according to the present invention, when compared to a conventional circuit using the rectifier and the DC-DC converter, the number of parts and passive elements are greatly decreased, thereby reducing an overall number of parts and a mounting area. Furthermore, in wireless charging, response is improved over the conventional structure due to a transient feature between a heavy load which is currently being charged and a light load which has been completely charged. Moreover, in a resonant multi-charging system, a circuit according to the present invention in which a resonating circuit, a rectifying circuit, and an adjustment circuit are formed integrally as one piece allows rapid and stable power transmission through proper closed loop active switching.

Figure 4:
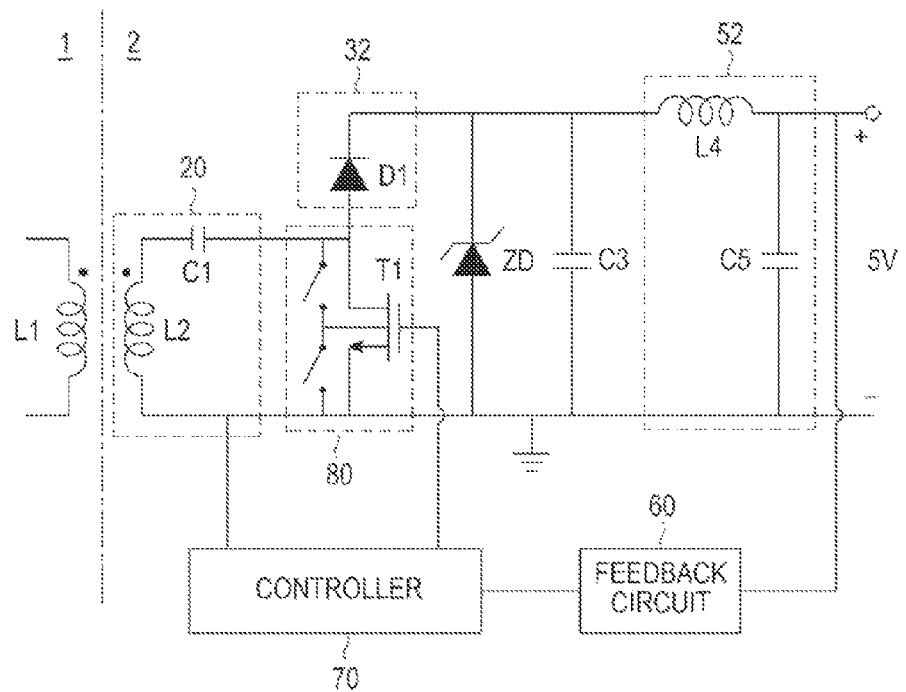
FIG. 4 is a circuit diagram of a received power conversion device for a resonant wireless charging system according to a second embodiment of the present invention.

FIG. 4 is a circuit diagram of a received power conversion device for a resonant wireless charging system according to a second embodiment of the present invention. Referring to FIG. 4, the received power conversion device has a similar structure as the first embodiment shown in FIG. 2, except that the free-wheeling switching unit 80 is implemented with a switch using a switching transistor which performs switch on/off operations under control of the controller 70, such as an n-type first Metal Oxide Semiconductor (MOS) FET T1.

Figure 5:
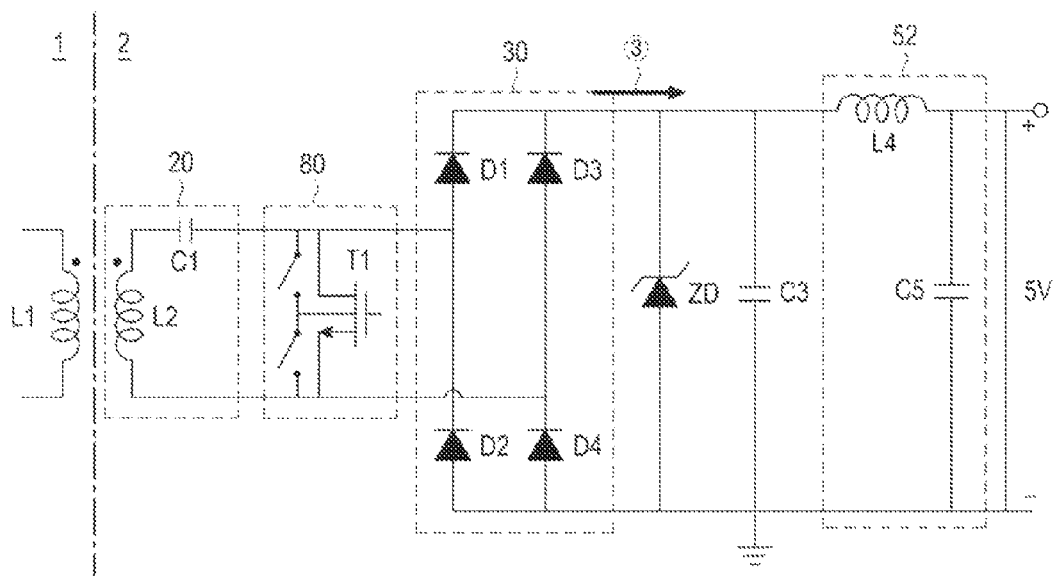
FIG. 5 is a circuit diagram of a received power conversion device for a resonant wireless charging system according to a third embodiment of the present invention.
Figure 6:
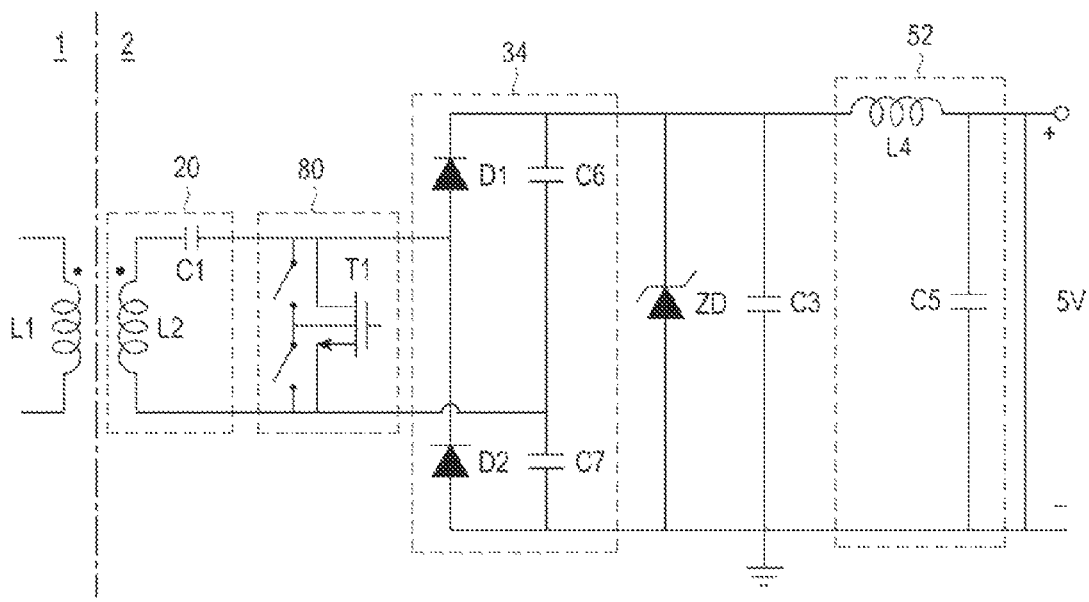
FIG. 6 is a circuit diagram of a received power conversion device for a resonant wireless charging system according to a fourth embodiment of the present invention.
Figure 7:
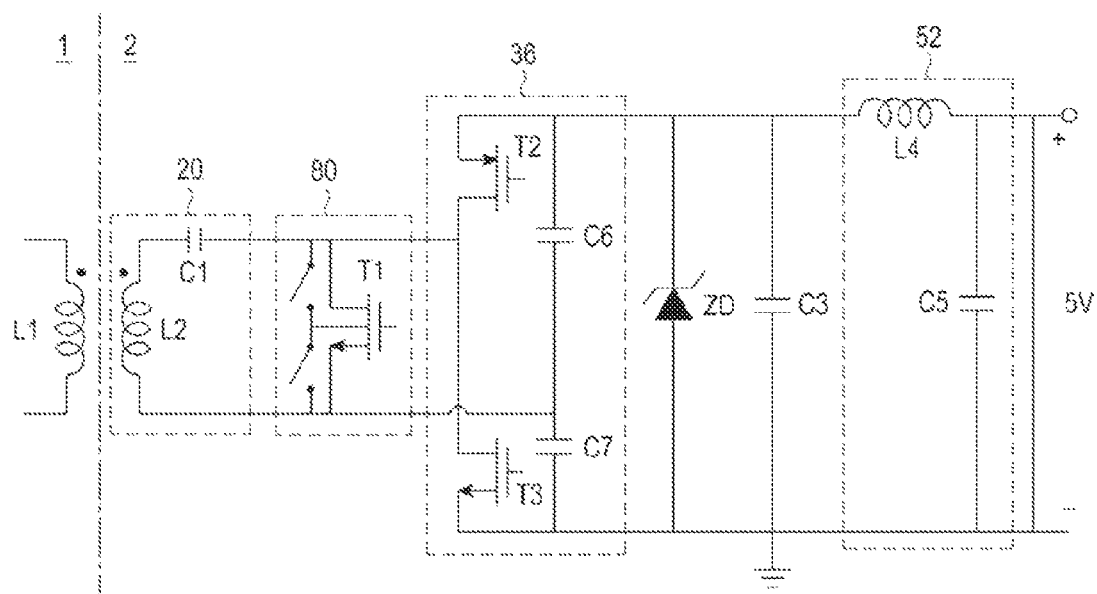
FIG. 7 is a circuit diagram of a received power conversion device for a resonant wireless charging system according to a fifth embodiment of the present invention.

FIGS. 5 through 7 are circuit diagrams of a received power conversion device for a resonant wireless charging system according to third through fifth embodiments of the present invention, which are similar to the second embodiment shown in FIG. 4, except for structures of rectifiers 30, 34, and 36 and connection relationships between the rectifiers 30, 34, and 36 and the wireless power receiver 20. For the sake of convenience, in FIGS. 5 through 7, the controller 70 and the feedback circuit 60 shown in FIG. 4 are omitted.

Referring to the third embodiment of the present invention shown in FIG. 5, the rectifier 30 has a full-bridge diode structure using four diodes D1, D2, D3, and D4. That is, a serial connection circuit of the first diode D1 and the second diode D2 and a serial connection circuit of the third diode D3 and the fourth diode D4 are connected in parallel. A connection node of the first diode D1 and the third diode D3 is set to be an output node, and a connection node of the second diode D2 and the fourth diode D4 is connected with the ground end.

In this case, one terminal and the other terminal of a serial connection circuit of the second coil L2 and the first capacitor C1 are connected with a connection point of the first diode D1 and the second diode D2 and a connection point of the third diode D3 and the fourth diode D4, respectively.

As such, the structure according to the third embodiment shown in FIG. 5 is an electric-wave rectifying structure. Therefore, a signal output from the rectifier 30 shown in FIG. 5 may be similar with the signal '3' of FIG. 3B.

The structure of the rectifier 34 according to the fourth embodiment of the present invention shown in FIG. 6 is different from that of the rectifier 30 according to the third embodiment of the present invention shown in FIG. 5. That is, the rectifier 34 has capacitors C6 and C7 in place of the third diode D3 and the fourth diode D4 of the rectifier 30 according to the third embodiment shown in FIG. 5.

The structure of the rectifier 36 according to the fifth embodiment of the present invention shown in FIG. 7 is different from that of the rectifier 34 in the structure according to the fourth embodiment of the present invention shown in FIG. 6. That is, the rectifier 36 has a p-type second MOSFET T2 and an n-type third MOSFET T3 in place of the first diode D1 and the second diode D2 of the rectifier 34 according to the fourth embodiment shown in FIG. 6.

On/off operating states of the second MOSFET T2 and the third MOSFET T3 are synchronized with each other, but are opposite to each other. Likewise, the second MOSFET T2 is configured such that the on/off operating states of the second MOSFET T2 and the first MOSFET T1 of the free-wheeling switching unit 80 are synchronized with each other, but are opposite to each other. That is, the first MOSFET T1 and the third MOSFET T3 have the same on/off periods and operating states.

Switching operations of such second MOSFET T2 and third MOSFET T3 may also be controlled by a controller (not shown), and as in the current embodiment, when the second MOSFET T2 and the third MOSFET T3 are of a p type and an n type, respectively, and the first MOSFET T1 of the free-wheeling switching unit 80 is of an n type, the second MOSFET T2 and third MOSFET T3 may operate with a single switching control signal that they simultaneously receive from the controller.

In this manner, by using the FET in place of the diode in the circuit structure of the rectifier, integration with other power circuits is possible and higher efficiency than the diode can be achieved.

The structure and operations of the received power conversion device for a resonant wireless charging system according to the present invention can be achieved as described above, and while specific embodiments of the present invention have been described in the foregoing description, other embodiments and changes or modifications thereof may be possible.

For example, the capacitors C6 and C7 in the rectifiers 34 and 36 shown in FIGS. 6 and 7 may be replaced with FETs, and the MOSFET T1 of the free-wheeling switching unit 80 as well as the FETs may also be configured of a p type and an n type.

As is apparent from the foregoing description, the received power conversion device for a resonant wireless charging system according to the present invention achieves high power and high efficiency and a small size, thus being suitable for application to equipment such as a portable terminal.

While the present invention has been shown and described with reference to certain embodiments and drawings thereof, it will be understood by those skilled in the art that various changes of the embodiments of the present invention may be made therein without departing from the spirit and scope of the invention as defined by the appended claims and their equivalents.

What is claimed is:

1. A received power conversion device for a resonant wireless charging system, the received power conversion device comprising:
    a wireless power receiver for receiving wireless power transmitted from a wireless power transmission device;
    a rectifier for rectifying power in an Alternating Current (AC) form received in the wireless power receiver into a Direct Current (DC);
    a free-wheeling switching unit for performing a switching operation according to a switching control signal and forming a path for free-wheeling the power in the AC form received in the wireless power receiver;
    a feedback circuit for being fed back with an output signal of the received power conversion device and for detecting a level of the output signal; and
    a controller for controlling a switching operation of the free-wheeling switching unit according to the output signal level detected by using the feedback circuit,
    wherein the free-wheeling switching unit forms the path for free-wheeling the power in the AC form when the free-wheeling switching unit is turned on, and cuts off the path for free-wheeling the power in the AC form and provides the power in the AC form to the rectifier when the free-wheeling switching unit is turned off.

2. The received power conversion device of claim 1, wherein the wireless power receiver comprises a second coil for absorbing electric waves emitted from a first coil of the wireless power transmission device and a resonant first capacitor serially connected with the second coil.

3. The received power conversion device of claim 1, wherein the free-wheeling switching unit comprises a first switching transistor for performing on/off operations under control of the controller.

4. The received power conversion device of claim 2, wherein the rectifier comprises a single first diode provided with power from the wireless power receiver to output the provided power, and
    in the wireless power receiver, one terminal and another terminal of a serial connection circuit of the second coil and the first capacitor are connected with the first diode and a ground end of the rectifier, respectively.

5. The received power conversion device of claim 2, wherein the rectifier has a structure in which a serial connection circuit of a first diode and a second diode and a serial connection circuit of a third diode and a fourth diode are connected in parallel with each other, and
    a connection node of the first diode and the third diode is set to be an output node and a connection node of the second diode and the fourth diode is connected with the ground end, and
    one terminal and another terminal of a serial connection circuit of the second coil and the first capacitor of the wireless power receiver are connected with a connection point of the first diode and the second diode and a connection point of the third diode and the fourth diode, respectively.

6. The received power conversion device of claim 2, wherein the rectifier has a structure in which a serial connection circuit of a first diode and a second diode and a serial connection circuit of a second capacitor and a third capacitor are connected in parallel with each other, and a connection node of the first diode and the second capacitor is set to be an output node and a connection node of the second diode and the third capacitor is connected with the ground end, and one terminal and another terminal of a serial connection circuit of the second coil and the first capacitor of the wireless power receiver are connected with a connection point of the first diode and the second capacitor and a connection point of the second diode and the third capacitor, respectively.

7. The received power conversion device of claim 2, wherein the rectifier has a structure in which a serial connection circuit of a second switching transistor and a third switching transistor and a serial connection circuit of a second capacitor and a third capacitor are connected in parallel with each other, and a connection node of the second switching transistor and the second capacitor is set to be an output node and a connection node of the third switching transistor and the third capacitor is connected with the ground end, and one terminal and another terminal of a serial connection circuit of the second coil and the first capacitor of the wireless power receiver are connected with a connection point of the second switching transistor and the second capacitor and a connection point of the third switching transistor and the third capacitor, respectively.

8. The received power conversion device of claim 7, wherein the second switching transistor and the third switching transistor comprise Metal Oxide Semiconductor Field Effect Transistors (MOSFETs).

9. The received power conversion device of claim 1, wherein the feedback circuit is implemented with a comparator which is fed back with an output signal of the received power conversion device, compares the output signal with a reference voltage, and outputs a comparison result.

10. The received power conversion device of claim 1, wherein the controller comprises:

a sync signal generator provided with a signal received in the wireless power receiver and generating a corresponding sync signal; and a driving unit for generating, as the switching control signal, a driving signal for on/off control of the free-wheeling switching unit according to an output of the feedback circuit in synchronization with the sync signal generated by the sync signal generator.

11. The received power conversion device of claim 1, further comprising:

a waveform stabilizer comprising an inductor and a capacitor and stabilizing and outputting a DC waveform of an output end of the received power conversion device; and a Zener diode for circuit protection and a third capacitor for power charging and stabilization, which are connected in parallel between the rectifier and the waveform stabilizer.

\* \* \* \* \*